US011138161B2

(12) United States Patent
Kline

(10) Patent No.: US 11,138,161 B2
(45) Date of Patent: *Oct. 5, 2021

(54) SINGLE TABLE MULTI-SCHEMA DATA STORE IN A KEY VALUE STORE

(71) Applicant: Google LLC, Mountain View, CA (US)

(72) Inventor: John Anthony Kline, Mountain View, CA (US)

(73) Assignee: Google LLC, Mountain View, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/416,956

(22) Filed: May 20, 2019

(65) Prior Publication Data
US 2019/0340159 A1 Nov. 7, 2019

Related U.S. Application Data

(63) Continuation of application No. 14/927,591, filed on Oct. 30, 2015, now Pat. No. 10,296,608.

(60) Provisional application No. 62/236,435, filed on Oct. 2, 2015.

(51) Int. Cl.
G06F 16/00 (2019.01)
G06F 16/21 (2019.01)
G06F 16/28 (2019.01)
G06F 16/2457 (2019.01)
(Continued)

(52) U.S. Cl.
CPC ........ *G06F 16/211* (2019.01); *G06F 16/2291* (2019.01); *G06F 16/2455* (2019.01); *G06F 16/24575* (2019.01); *G06F 16/284* (2019.01)

(58) Field of Classification Search
None
See application file for complete search history.

(56) References Cited

U.S. PATENT DOCUMENTS 6,192,366 B1 2/2001 Ogawa
6,470,329 B1 10/2002 Livschitz
7,178,029 B2 2/2007 Ansper et al.
(Continued)

FOREIGN PATENT DOCUMENTS

CN 1897518 1/2007
CN 101964789 A 2/2011
EP 0872080 A1 10/1998

OTHER PUBLICATIONS

Extended European Search Report for European Patent Application No. 19180197.6 dated Sep. 27, 2019. 6 pages.
(Continued)

*Primary Examiner* — Bai D Vu
(74) *Attorney, Agent, or Firm* — Lerner, David, Littenberg, Krumholz & Mentlik, LLP

(57) ABSTRACT

A system of creating a multi-schema data store of a key-value store may include a computing device, a first computer-readable storage medium portion comprising a multi-schema data store, and a second computer-readable storage medium portion in communication with the first computer-readable storage medium portion. The system may receive data to be added to the multi-schema data store that includes data that is associated with a plurality of schemas, determine a unique identifier associated with the data, and parse the data to identify a plurality of data sets from the received data to be stored in the multi-schema data store. The system creates an entry in the multi-schema data store for each data set, and stores each data set in one of the created entries along with the unique identifier.

8 Claims, 6 Drawing Sheets

(51) Int. Cl.
*G06F 16/22* (2019.01)
*G06F 16/2455* (2019.01)

(56) References Cited

U.S. PATENT DOCUMENTS

| | | |
|---|---|---|
| 7,328,243 B2 | 2/2008 | Yeager et al. |
| 7,701,953 B2 | 4/2010 | Chen et al. |
| 7,949,606 B1 | 5/2011 | Sweet |
| 8,527,461 B2 | 9/2013 | Ducott, III et al. |
| 9,077,759 B2 | 7/2015 | Brouwer et al. |
| 9,276,749 B2 | 3/2016 | Tenenboym et al. |
| 9,800,416 B2 | 10/2017 | Tenenboym et al. |
| 2002/0009165 A1 | 1/2002 | Friedman |
| 2003/0120665 A1 | 6/2003 | Fox et al. |
| 2004/0088646 A1 | 5/2004 | Yeager et al. |
| 2006/0174204 A1 | 8/2006 | Jung et al. |
| 2008/0005188 A1 | 1/2008 | Li et al. |
| 2008/0021720 A1 | 1/2008 | Glinberg |
| 2009/0006642 A1 | 1/2009 | Dickens et al. |
| 2009/0217047 A1 | 8/2009 | Akashika et al. |
| 2011/0004636 A1 | 1/2011 | Parkkinen et al. |
| 2011/0110568 A1 | 5/2011 | Vesper et al. |
| 2011/0179089 A1 | 7/2011 | Idicula et al. |
| 2012/0190386 A1 | 7/2012 | Anderson |
| 2013/0013648 A1 | 1/2013 | Monjas Llorente et al. |
| 2014/0040611 A1 | 2/2014 | Tenenboym et al. |
| 2014/0189762 A1 | 7/2014 | Hainline |
| 2014/0215574 A1 | 7/2014 | Erb et al. |
| 2015/0019982 A1 | 1/2015 | Petitt, Jr. et al. |
| 2015/0127610 A1 | 5/2015 | Besen et al. |
| 2015/0127733 A1 | 5/2015 | Ding et al. |
| 2015/0163206 A1 | 6/2015 | McCarthy et al. |
| 2015/0281353 A1 | 10/2015 | Mahkovec et al. |
| 2015/0310188 A1 | 10/2015 | Ford et al. |
| 2015/0350308 A1 | 12/2015 | Cosentino et al. |
| 2016/0037215 A1 | 2/2016 | Cardona |
| 2016/0099963 A1 | 4/2016 | Mahaffey et al. |
| 2016/0188706 A1 | 6/2016 | Momosaki et al. |
| 2016/0191608 A1 | 6/2016 | Zaid et al. |
| 2017/0235970 A1 | 8/2017 | Conner |

OTHER PUBLICATIONS

Corbett et al., Spanner: Google's Globally-Distributed Database, published in the Proceedings of OSDI 2012, http://static.googleusercontent.com/media/research.google.com/en//archive/spanner-osdi2012.pdf.
Database Administrators Guide, Creating Clusters, <http://docs.oracle.com/cd/B28359_01/server.111/b28310/clustrs003.htm>, downloaded from internet Oct. 29, 2015.
Database SQL Tuning Guide, Guidelines for Indexes and Table Clusters, https://docs.oracle.com/database/121/TGSQLtgsql_indcl.htm#TGSQL870, downloaded from internet Oct. 29, 2015.
Database Concepts, Tables and Table Clusters, https://docs.oracle.com/database/121/CNCPT/tablecls.htm#i25478, downloaded from internet Oct. 29, 2015.
U.S. Appl. No. 15/284,116, filed Oct. 3, 2016.
Information about Related Patents and Patent Applications, see section 6 of the accompanying Information Disclosure Statement Letter, which concerns Related Patents and Patent Applications.
International Search Report and Written Opinion dated Dec. 6, 2016, issued in Application PCT/US2016/054895.
FileSync/NDN: Peer-to-Peer File Sync over Named Data Networking (Mar. 2013).
Introduction to Microsoft Sync Framework File Synchronization Provider (Oct. 2009).
"Syncbase Syncing Data", as published <https://vanadium.github.io/syncbase/guides/synchronization.html>, retrieved from the Internet Sep. 5, 2016.
International Search Report and Written Opinion dated Dec. 9, 2016, issued in Application PCT/US2016/054871.
U.S. Appl. No. 14/927,591, filed Oct. 30, 2015.
U.S. Appl. No. 15/284,078, filed Oct. 3, 2016.
International Search Report and Written Opinion dated Jan. 3, 2017, issued in Application No. PCT/US2016/054859.
Sandhu R.S. et al., "Access Control: principle and practice", IEEE Communications Magazine, IEEE Service Center, Piscataway, US, vol. 32, No. 9, Sep. 1, 1994, pp. 40-48.
International Preliminary Report on Patentability dated Apr. 12, 2018, for International Application No. PCT/US2016/054859. 7 pages.
International Preliminary Report on Patentability dated Apr. 12, 2018, for International Application No. PCT/US2016/054871. 7 pages.
International Preliminary Report on Patentability dated Apr. 12, 2018, for International Patent Application No. PCT/US2016/054895. 8 pages.
Office action issued in Chinese patent application 201680059104.7, dated Jan. 24, 2019, 5 pages.
English Translation of Office action issued in Chinese patent application 201680059104.7, dated Jan. 24, 2019, 7 pages.
Anonymous: "Version vector—Wikipedia", Jun. 13, 2015 (Jun. 13, 2015), XP055626804. 2 pages. Retrieved from the Internet: URL: https://en.wikipedia.org/w/index.php?title=Version_vector&oldid=666811850.
Anonymous: "Wireless ad hoc network—Wikipedia", Sep. 27, 2015 (Sep. 27, 2015), XP055631350. 6 pages. Retrieved from the Internet: URL: https://en.wikipedia.org/w/index.php?title=Wireless_ad_hoc_network&oldid=682978409.
E-mail Opinion on European Patent Application No. 16781634.7. dated Oct. 15, 2019. 4 pages.

Invoice

Numbat Corp.

2015-08-13

1,000 pencils  $200

100 erasers  $50

1,000 black ballpoint pens $300

TOTAL: $550

Invoice

Wombat, Inc.

2015-07-25 ten LED lightbulbs  $143 ten lightbulb sockets  $120

TOTAL: $263

Key-value store
312

Data store
306

| | | | |
|---|---|---|---|
| 123 | 2015-07-25 | Wombat, Inc. | 302 |
| 123 | 1 | ten LED lightbulbs $143 | 300 |
| 123 | 2 | ten lightbulb sockets $120 | |
| 256 | 2015-08-13 | Numbat Corp. | 304 |
| 256 | 1 | 1000 pencils $200 | 308 |
| 256 | 2 | 100 erasers $50 | 310 |
| 256 | 3 | 1000 black ballpoint pens $300 | |

SINGLE TABLE MULTI-SCHEMA DATA STORE IN A KEY VALUE STORE

CROSS-REFERENCE TO RELATED APPLICATIONS

This application is a continuation of U.S. patent application Ser. No. 14/927,591 filed Oct. 30, 2015, which claims priority to U.S. Provisional Patent Application No. 62/236,435, filed on Oct. 2, 2015, the entirety of which is included herein by reference.

BACKGROUND

Relational databases typically associate a schema with each table. The use of a schema has several benefits in this situation such as defining how comparisons and joins of data columns are to be performed, and semantic checking of Data Manipulation Language (DML) statements. However, a challenge exists with traditional key-value stores because they operate differently than relational databases.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of creating a multi-schema data store of a key-value store may include a computing device, a first computer-readable storage medium portion comprising a multi-schema data store, and a second computer-readable storage medium portion in communication with the first computer-readable storage medium portion. The second computer-readable storage medium portion includes programming instructions that are configured to cause the computing device to receive data to be added to the multi-schema data store that includes data that is associated with a plurality of schemas, determine a unique identifier associated with the data, and parse the data to identify a plurality of data sets from the received data to be stored in the multi-schema data store. The system creates an entry in the multi-schema data store for each data set, and stores each data set in one of the created entries along with the unique identifier such that a data set that is associated with a first schema from the plurality of schemas is stored in proximity of a data set that is associated with a second schema from the plurality of schemas.

Optionally, the system identifies a data type associated with the received data, and identifies a multi-schema data store that includes data of the identified data type.

In an embodiment, the system may store each data set in an attribute configuration associated with a schema from the plurality of schemas that corresponds to the data set.

Optionally, the system may store each data set in one of the created entries such that the data sets are stored in an order that corresponds to an order in which the data sets were parsed.

In an embodiment, a system of accessing a multi-schema data store of a key-value store may include a computing device, a first computer-readable storage medium portion comprising a multi-schema data store, and a second computer-readable storage medium portion in communication with the first computer-readable storage medium portion. The second computer-readable storage medium portion may include programming instructions that are configured to cause the computing device to receive a query to search for data from the multi-schema data store, where a first portion of the data corresponds to a first schema and a second portion of the data corresponds to one or more other schemas, and the query comprises a unique identifier associated with the data. The system may parse one or more entries of the multi-schema data store in a sequential order until a first entry is found that corresponds to the unique identifier, compare the query to one or more proximate entries of the multi-schema data store, so that the proximate entries are located in proximity to the first entry, and return one or more search results that includes data from the first entry and/or one or more of the proximate entries that satisfies the query.

Optionally, the system may determine a schema associated with the first entry. In an embodiment, the system may identify an attribute configuration associated with the first entry.

In an embodiment, the system may identify a second schema associated with one or more of the proximate entries of the multi-schema data store, and determine that the schema associated with the first entry is above the second schema in a hierarchy.

BRIEF DESCRIPTION OF THE DRAWINGS

FIG. 2 illustrates example invoices according to an embodiment.

FIG. 3 illustrates an example key-value store having a single data store that supports multiple schemas according to an embodiment.

DETAILED DESCRIPTION

The following terms shall have, for purposes of this application, the respective meanings set forth below:

An "attribute" refers to a value, characteristic or parameter associated with a schema.

A "data store" refers to a repository of data objects, data structures and/or the like. Example data stores include, without limitation, tables, databases, and/or the like.

An "electronic device" or a "computing device" refers to a device that includes a processor and non-transitory, computer-readable memory hardware. The memory may contain or receive programming instructions that, when executed by the processor, cause the electronic device to perform one or more operations according to the programming instructions. Examples of computing devices include personal computers, servers, mainframes, gaming systems, televisions, and mobile electronic devices such as smartphones, personal digital assistants, cameras, tablet computers, laptop computers, media players and the like. In a client-server arrangement, the client device and the server are each electronic devices.

A "key-value store" refers to one or more data stores having one or more entries for which stored data is associated with a key value that can be used to access such data. Key-value pairs may be stored, and the pairs may be accessed sequentially or a value may be accessed via a corresponding key.

A "relational database" refers to a data structure for storing data such that the data is organized based on a relational model.

A "schema" refers to a data type that describes one or more values in a key-value store.

Except where specifically stated otherwise, the singular term "processor" or "processing device" is intended to include both single-processing device embodiments and embodiments in which multiple processing devices together or collectively perform a process. Similarly, except where specifically stated otherwise, the terms "memory," "data store," "data storage facility" and the like are intended to include single device embodiments, embodiments in which multiple memory devices together or collectively store a set of data or instructions, as well as individual sectors within such devices.

Figure 1:
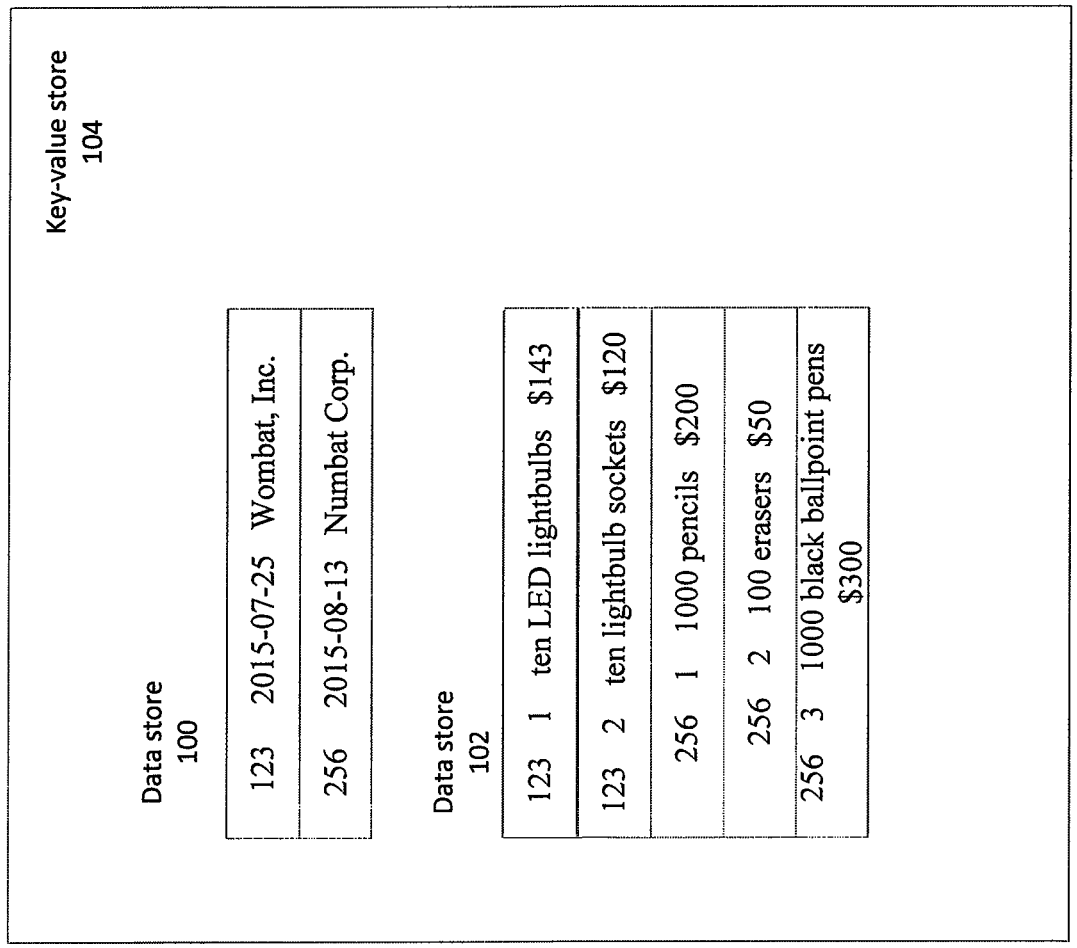
FIG. 1 illustrates an example key value-store having two separate data stores according to an embodiment.

FIG. 1 illustrates an example key value-store 104 having two separate data stores 100, 102 according to an embodiment. The example data stores 100, 102 illustrated in FIG. 1 each correspond to the example invoices illustrated in FIG. 2. As shown in FIG. 2, a first invoice 200 is from supplier Wombat Inc. while the second invoice 202 is from supplier Numbat Corp. Each invoice identifies a date and the supplier. Each invoice also includes one or more line items specifying a line item number, an item name, and an amount. In this example, an invoice may be considered to be a first schema and line items may be considered to be a second schema. A schema may be useful in several ways, including: (1) it allows for sanity checking of inserted values and of field names and types in data manipulation language (DML) statements; (2) it defines how comparisons of data are to be performed (for example when sorting, joining rows, or performing queries); and (3) it becomes more efficient to perform data transformations when the schema is changed or viewed in different ways.

The data stores 100, 102 illustrated in FIG. 1 show example data stores in a relational model. For instance, data store 100 specifies invoices, while data store 102 specifies line items from both invoices, as both are distinct data types. In other words, each data store illustrated in FIG. 1 is associated with only one schema. Because of this configuration, a query that touches invoice 123 is likely to also access each line item whose invoice number is also 123. As such, queries may be more efficient if the data were stored in disc interleaved.

FIG. 3 illustrates a key-value store 312 having a single data store that supports multiple schemas according to an embodiment. For example, the data store 306 in FIG. 3 is associated with both the invoice and line item schemas. As shown in FIG. 3, line item information for an invoice is stored in one or more data store entries that are proximate to the entry in which the invoice information is stored. For example, line item number 1 from the first invoice is stored in an entry 300 immediately below the entry 302 containing invoice information. This configuration may be achieved by reading into memory the line items of the invoice at substantially the same time that the data for the invoice is read into memory to achieve a locality of reference.

Figure 4:
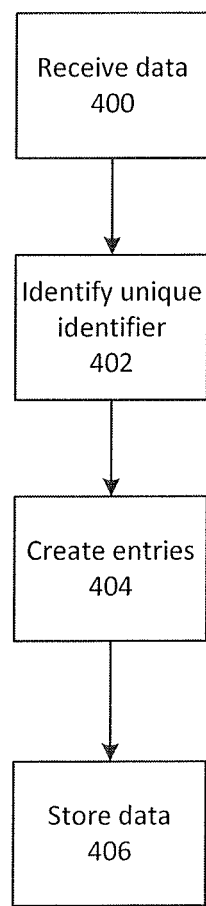
FIG. 4 illustrates a flow chart of an example method of populating a multi-schema data store according to an embodiment.

FIG. 4 illustrates a flow chart of an example method of populating a multi-schema data store according to an embodiment. As shown in FIG. 4, a processor may receive 400 data that is to be added to a multi-schema data store. The data may be associated with a particular data type or category of data. A processor may identify a relevant data store in which to store the data based on the data type. For instance, referring to the above example, the data includes invoice or customer data, so a processor may determine that the "Customer" data store is the appropriate storage location.

Each value in a key-value store may be associated with one schema, but the values may not necessarily be associated with the same schema. For instance, referring to the above example, a processor may receive data from an invoice having an invoice schema and a line item associated with a line item schema. Other examples may include data from receipts, publications, examinations, or other hierarchical data. In various embodiments, data may include more than two levels of hierarchy. For instance, invoice data may be associated with three levels of hierarchy (e.g., Customer, Invoice, LineItem), and therefore three schemas.

The processor may identify 402 a unique identifier associated with the received data. The identifier may indicate that corresponding data originated with the same source. For instance, referring to example above, an invoice number may be used as a unique identifier for an invoice.

A processor may create 404 one or more entries in a data store to store at least a portion of the identified data. For instance, if a data store is a table or database, a processor 404 may create one or more new entries or other locations in the table or database to store at least a portion of the identified data. In certain embodiments, a processor may create 404 an entry for each data set to be stored.

A processor may store 406 at least a portion of received data in one or more created entries. In various embodiments, a processor may store 406 data in a particular format that corresponds to an attribute configuration associated with a relevant schema. An attribute configuration refers to a particular format or ordering of data. For instance, a processor may determine that a particular data set is of a LineItem schema, and that the corresponding attribute configuration is {line item number, quantity, description, cost}. As such, a processor may cause the data set to be stored 406 in this configuration.

In an embodiment, a processor may store 406 data in created entries in a particular order. For instance, a processor may store received data in entries in the order that it is parsed, regardless of to what schema it corresponds. As such, data sets corresponding to different schemas that are associated with a unique identifier may be stored in proximity to one another in a data store. For instance, referring back to FIG. 3, a processor may store 406 data associated with the invoice schema in a data store such that it is in proximity to data associated with the line item schema. In other words, data corresponding to one schema may be interleaved with data corresponding to another schema in a single data store. A parent/child hierarchy may exist between values of a key-value store. The parent values may be stored first, followed by the child values. For instance, in the above example, information associated with the Invoice schema may be considered parent information, and may be stored first. Information associated with the LineItem schema may be considered child information and may be subsequently stored.

In an embodiment, a processor may store 406 the unique identifier or key of data along with each corresponding data set in the data store entries. For instance, with respect to FIG. 3, the key "123" is stored along with each data set from the Wombat invoice, while the key "256" is stored along with each data set from the Numbat invoice.

In certain embodiments, a processor may store 406 data in a way that connotes a hierarchy between or among schemas. In other words, a hierarchy may be inferred based on the ordering of schemas in the data store. For instance, information associated with a schema that is stored in a data store entry that precedes another data store entry may indicate that the subsequently stored schema is associated with the preceding schema. For instance, referring to FIG. 3, because information associated with the LineItem schema is stored in entries in a data store that are positioned after (or below) those associated with the Invoice schema, it may be assumed that the LineItem schema is associated with the preceding Invoice schema. In various embodiments, a hierarchy may be arbitrarily deep and multiple sibling hierarchies may exist at any level within a data store.

Figure 5:
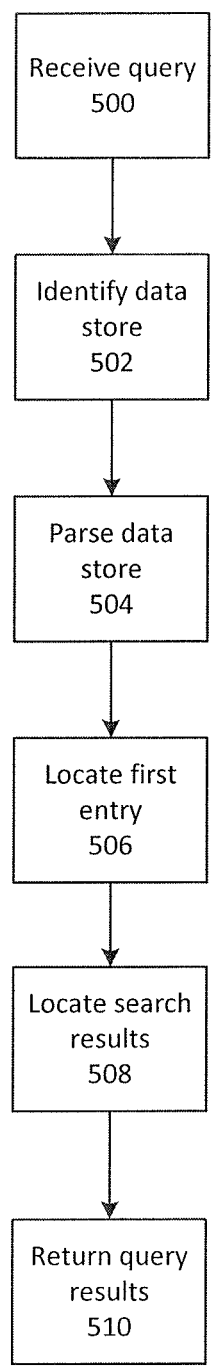
FIG. 5 illustrates a flow chart of an example method of querying a multi-schema data store according to an embodiment.

FIG. 5 illustrates a flow chart of an example method of querying a multi-schema data store according to an embodiment. As shown in FIG. 5, a processor may receive 500 a query. The query may include one or more instructions to search for certain data from a multi-schema data store. The following may be an example format for a query for the multi-schema data store of FIG. 3:

---
select Invoice.Number, Invoice.Date, Invoice.CustomerName, LineItem.Num, LineItem.Desc, LineItem.Amout from Customer As Invoice, Customer As LineItem wherein Invoice.Number = LineItem.InvoiceNum

---

For instance, this query format may be used to query a multi-schema data store for a part number and a quantity of a line item associated with a LineItem schema that corresponds to a particular invoice number and date associated with an Invoice schema in a Customer data store.

For example, the following query may be used to select data store entries 300, 302 from FIG. 3:

---
Select Invoice.Number, Invoice.Date, InvoiceCustomerName, LineItem.Num, LineItem.Desc, LineItem.Amount from Customer as Invoice, Customer as LineItem wherein Invoice.Number = 123 and LineItem.Num = 1 and Invoice.Number = LineItem.InvoiceNum

---

A processor may identify 502 a particular data store from at least a portion of the received query. For instance, in the above example, a processor may identify the "Customer" data store. The processor may parse 504 the identified data store for an entry associated with a unique identifier or key as specified by the query. In the above example, the query identifies that both schemas (Invoice and LineItem) correspond to the key "256." As such, a processor may parse the Customer data store for an entry associated with the key "256."

In an embodiment, a processor may locate 506 a first entry in the data store that corresponds with the particular identifier or key. For instance, referring to FIG. 3, a processor may identify entry 304 in the data store as a first entry that corresponds to key "256." As mentioned above, because information may be stored hierarchically in a data store, a processor may assume that because the Invoice schema is associated with the first entry corresponding to the key "256" that the LineItem schema is a sub-schema of the Invoice schema. In various embodiments, a processor may identify a schema associated with a data store entry based on an attribute configuration of the entry. For instance, an entry corresponding to an Invoice schema may have the attribute configuration {date, vendor}, whereas a LineItem schema may have one or more of the following attribute configuration {line item number, quantity, item description, cost}. Additional and/or alternate schemas, attributes and/or schema/attribute configuration combinations may be used within the scope of this disclosure.

In certain embodiments, once a processor locates 506 a first entry in the data store that corresponds to a particular identifier or key, the processor may search one or more subsequent entries of the data store for query results, recognizing that by virtue of locality of reference, related information is likely to be stored in proximity to the located entry.

In various embodiments, a processor may locate 508 search results for a query. For instance, a processor may join information from a data store that satisfies the query. In certain embodiments, a processor may join information across different schemas that satisfies a query. A processor may return 510 one or more query results for display to a user, use by a process and/or the like.

For instance, the following query may be posed:

---
select Invoice.Number, Invoice.Date, LineItem.Num, LineItem.Amount from Customer as Invoice, Customer As LineItem where Invoice.Number = LineItem.InvoiceNum

---

The phrase "where Invoice.Number=LineItem.InvoiceNum" represents an explicit join. In an embodiment, an automatic join may be implemented by leaving off the explicit join phrase from a query. For example, an automatic join may be performed according to the following query:

---
select Invoice.Number, Invoice.Date, LineItem.Num, LineItem.Amount from Customer as Invoice, Customer as LineItem

---

A processor may not recognize how to join information from an automatic join, but the processor may perform a join assuming a hierarchy. In this way, referring to the above example, all line items that follow an invoice may be joined to the invoice until another invoice is encountered.

In various embodiments, a query may utilize one or more aliases. An alias may refer to a word or a phrase that renames a certain other word or phrase. For instance, in the portion of a query that reads "Customer as LineItem," LineItem might be registered as an alias for a particular schema in the data store. If so, the schema registered with the alias LineItem will be used.

In an embodiment, the author of a query may know if the data to be searched is hierarchical, and may assume that a query may be more efficient when the data is hierarchical. In embodiments when the author of the query doesn't know the data store is hierarchical, a processor may run a query to return results twice. During the first search, the processor may not assume that a hierarchy is present. During the second search, the processor may not make an assumption of the hierarchy. If both queries return the same results, the processor may run subsequent queries assuming that a hierarchy exists.

Figure 6:
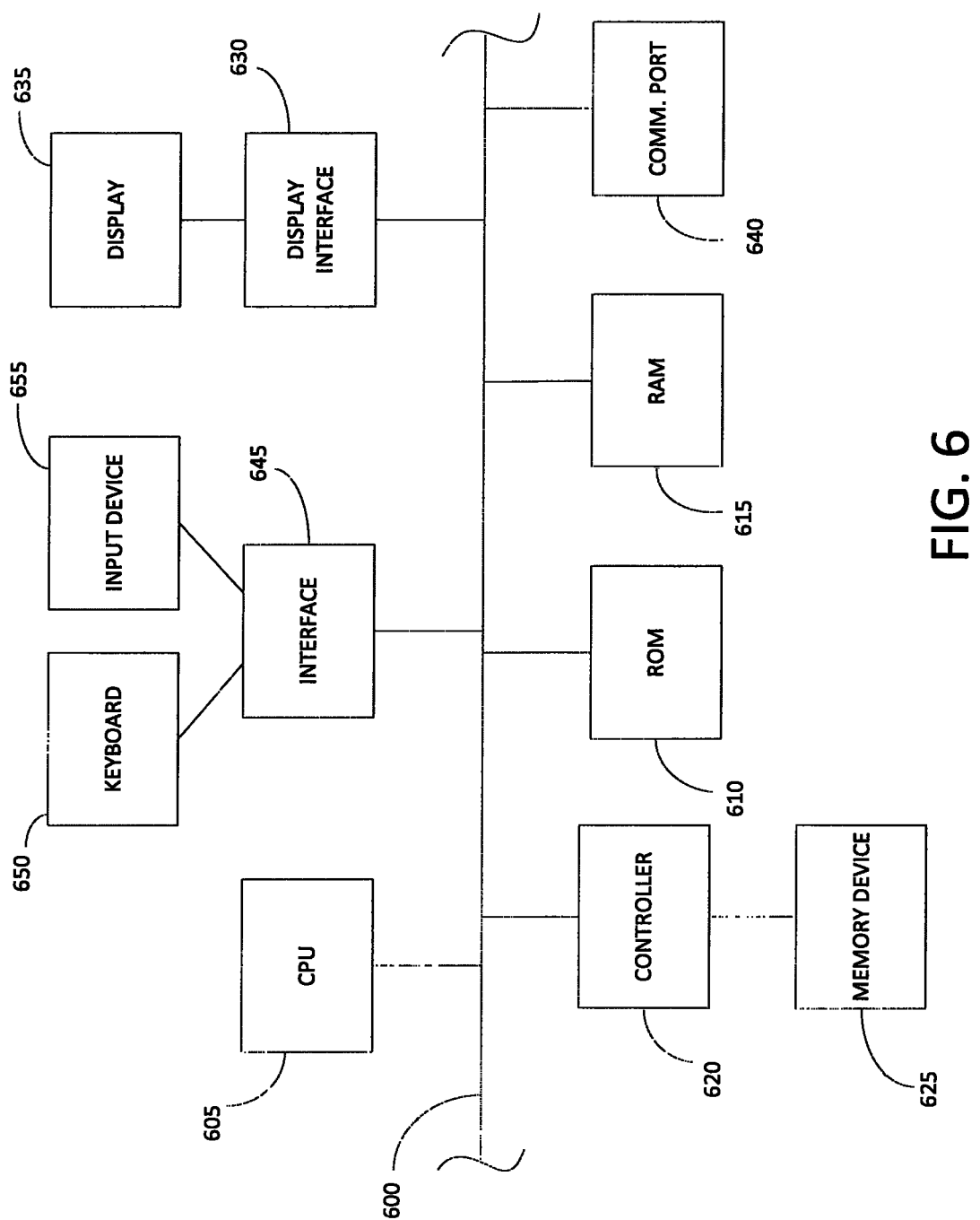
FIG. 6 illustrates a block diagram of example hardware that may be used to contain or implement program instructions and communication with other devices according to various embodiments.

FIG. 6 depicts a block diagram of hardware that may be used to contain or implement program instructions. A bus 600 serves as an information highway interconnecting the other illustrated components of the hardware. Processor (CPU) 605 is a central processing device of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media (i.e., memory device 625) to the system bus 600. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on the storage media 625 discussed above.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communication network, such as the Internet or an intranet.

The hardware may also include an interface 645 which allows for receipt of data from input devices such as a keyboard 650 or other input device 655 such as a mouse, a touch pad, a touch screen, a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system of creating a multi-schema data store, the system comprising:
   a computing device;
   a first computer-readable storage medium portion comprising a multi-schema data store, wherein the multi-schema data store is part of a key value store; and
   a second computer-readable storage medium portion in communication with the first computer-readable storage medium portion, wherein the second computer-readable storage medium portion comprises programming instructions that are configured to cause the computing device to:
      receive data to be added to the multi-schema data store, wherein the received data includes data that is associated with a plurality of schemas,
      determine a unique identifier associated with the data,
      parse the received data to identify a plurality of data sets to be stored in the multi-schema data store,
      create an entry in the multi-schema data store for each data set, and
      store each data set in one of the created entries along with the unique identifier, wherein a data set that is associated with a first schema from the plurality of schemas is stored in proximity of a data set that is associated with a second schema from the plurality of schemas in interleaved format in the multi-schema data store.

2. The system of claim 1, further comprising programming instructions that are configured to cause the computing device to:
   identify a data type associated with the received data; and
   identify a multi-schema data store that includes data of the identified data type.

3. The system of claim 1, wherein the programming instructions for storing each data set in one of the created entries comprise programming instructions to store each data set in an attribute configuration associated with a schema from the plurality of schemas that corresponds to the data set.

4. The system of claim 1, wherein the programming instructions for storing each data set in one of the created entries comprise programming instructions to store each data set in one of the created entries in an order that corresponds to an order in which the data sets were parsed.

5. A method of creating a multi-schema data store, the method comprising:
   receiving, by a computing device, data to be added to a multi-schema data store contained in a computer-readable storage medium portion, the multi-schema data store being part of a key value store, wherein the received data includes data that is associated with a plurality of schemas;
   determining a unique identifier associated with the data;
   parsing, by the computing device, the received data to identify a plurality of data sets to be stored in the multi-schema data store;
   creating, by the computing device, an entry in the multi-schema data store for each data set; and
   storing each data set in one of the created entries along with the unique identifier, wherein a data set that is associated with a first schema from the plurality of schemas is stored in proximity of a data set that is associated with a second schema from the plurality of schemas in interleaved format in the multi-schema data store.

6. The method of claim 5, further comprising:
   identifying a data type associated with the received data; and
   identifying a multi-schema data store that includes data of the identified data type.

7. The method of claim 5, wherein storing each data set in one of the created entries comprises storing each data set in an attribute configuration associated with a schema from the plurality of schemas that corresponds to the data set.

8. The method of claim 5, wherein storing each data set in one of the created entries comprises storing each data set in one of the created entries in an order that corresponds to an order in which the data sets were parsed.

* * * * *